H. C. LEADLEY.
BALE HOOK.
APPLICATION FILED JULY 29, 1920.
1,413,170.
Patented Apr. 18, 1922.
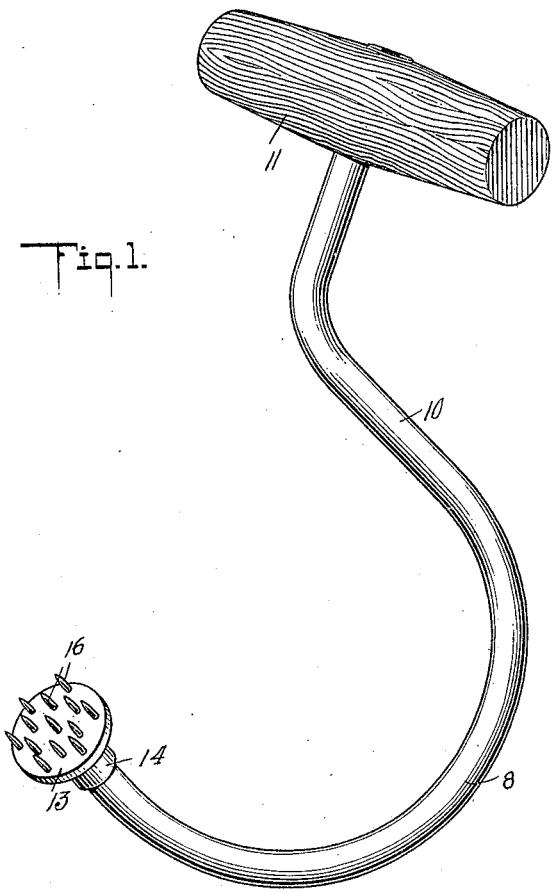
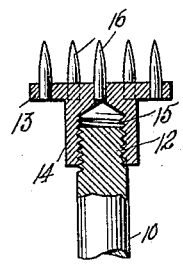
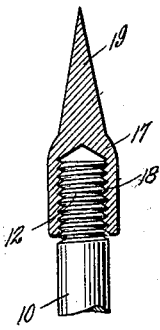
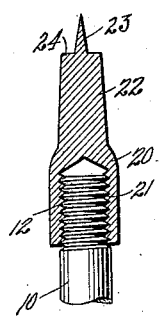
WITNESSES
INVENTOR
H.C. LEADLEY
BY
ATTORNEYS

ID OFFICE.

UNITED STATES PATENT OFFICE.

HARCOURT C. LEADLEY, OF NEW YORK, N. Y.

BALE HOOK.

1,413,170.

Specification of Letters Patent.   Patented Apr. 18, 1922.

Application filed July 29, 1920. Serial No. 399,741.

*To all whom it may concern:*

Be it known that I, HARCOURT C. LEADLEY, a citizen of the United States, and a resident of city of New York, Port Richmond, borough of Richmond, county of Richmond, and State of New York, have invented a new and improved Bale Hook, of which the following is a full, clear, and exact description.

This invention relates to an improvement in bale hooks used for handling bales, bags, boxes or the like.

Heretofore, hooks of this character have comprised a handle provided with a pointed shank which when used in connection with a bag or bale, permitted unlimited penetration of the point thereof into the bag which in some cases seriously damaged the contents. In order to overcome the objection to the use of a bale hook of this character, numerous improved hooks have been provided for various purposes to limit the penetration of the hook by providing a plurality of small points at the extremity thereof. This necessitates the use of a plurality of hooks for the various purposes to which they may be adapted.

The primary object of the present invention therefore is to provide a single hook with a plurality of detachable bale engaging devices which may be readily attached to the free extremity of the hook to adapt it to many usages.

A further object of the invention is to provide a device of the character described which is comparatively simple in construction, inexpensive to manufacture and produce and which is highly efficient in its purpose.

With the above recited and other objects in view, some of which will be apparent hereafter, reference is had to the following detail description, the appended claim and accompanying drawings forming a part of this application, in which;

Figure 1 is a perspective view of a hook constructed in accordance with the invention with one of the detachable bale engaging devices applied thereon.

Figure 2 is a fragmentary detail sectional view therethrough.

Figure 3 is a similar view of a modified form of bale engaging member.

Figure 4 is a similar view of a further modification of the bale engaging member.

Referring to the drawings by characters of reference, 10 designates the shank of a hook, one extremity of which is provided with the usual form of handle 11. The free extremity of the shank 10 is threaded as at 12 to provide means for association therewith of various forms of bale engaging devices. The bale engaging device illustrated in Figures 1 and 2 as the preferred form of the invention, comprises a disc-like base 13, one side of which is provided with a hollow boss 14 interiorly threaded as at 15 to receive and co-act with the threaded extremity 12 of the shank. The opposite side of the base 13 is formed with a plurality of outwardly projecting pointed tines 16. By this construction of a bale engaging device, the bale hook is especially adapted for use in handling sacks of grain, sugar or bales of material which might be harmed by the use of the ordinary form of bale hook, in that the base 13 limits the penetration of the points and distributes the strain over a larger surface of the bag or bale. The threaded connection between the bale engaging member and the free extremity of the shank serves to permit of the detachable association of said member with the shank and use of various forms of said members.

In Figure 3, a bale engaging member is illustrated, which comprises a base 17 having an interiorly threaded bore 18 and a single pointed extremity 19.

In Figure 4 a bale engaging member comprising a base 20 having an interiorly threaded bore 21 is provided with a shank 22 having a reduced pointed extremity 23, the juncture of the point 23 with said shank forming a shoulder 24. In use of the device the shoulder 24 functions to limit the penetration of the reduced point 23.

While there have been illustrated several preferred embodiments of the invention, it is to be understood that the right is reserved to embodiments other than those actually shown, to the full extent indicated by the general meaning of the terms in which the claim is expressed and by changes in the phrasing of the same.

Having thus described my invention, I claim as new and desire to secure by Letters Patent:—

A bale hook including a handle, a shank having a threaded extremity, and a bale engaging member comprising a disk having an interiorly threaded boss projecting from one side thereof and adapted to receive the threaded extremity of the shank to provide detachable means of association of the same therewith, said disk having a plurality of pointed tines projecting from the opposite side thereof for penetrating and gripping the article to be handled by the bale, the disk serving as a means for limiting the penetration of said tines into said article.

HARCOURT C. LEADLEY.